(12) United States Patent
Yu et al.

(10) Patent No.: US 11,051,322 B2
(45) Date of Patent: Jun. 29, 2021

(54) DATA PROCESSING METHOD, APPARATUS, AND SYSTEM

(71) Applicant: HUAWEI TECHNOLOGIES CO., LTD., Guangdong (CN)

(72) Inventors: Feng Yu, Beijing (CN); Xin Xiong, Beijing (CN); Haifeng Yu, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/506,187

(22) Filed: Jul. 9, 2019

(65) Prior Publication Data
US 2019/0334834 A1   Oct. 31, 2019

Related U.S. Application Data

(63) Continuation of application No. PCT/CN2017/115663, filed on Dec. 12, 2017.

(30) Foreign Application Priority Data

Jan. 10, 2017 (CN) .......................... 201710018782.5

(51) Int. Cl.
*H04L 5/00* (2006.01)
*H04L 12/801* (2013.01)
(Continued)

(52) U.S. Cl.
CPC ....... *H04W 72/1263* (2013.01); *H04L 5/0051* (2013.01); *H04L 5/0053* (2013.01);
(Continued)

(58) Field of Classification Search
CPC .......... H04L 5/003–0098; H04L 47/10; H04L 47/14; H04L 47/24–2491;
(Continued)

(56) References Cited

U.S. PATENT DOCUMENTS

2004/0184434 A1* 9/2004 Sebire ............... H04W 72/1242
2005/0249114 A1* 11/2005 Mangin ................. H04W 72/10
(Continued)

FOREIGN PATENT DOCUMENTS

CN           1682502 A    10/2005
CN         101369967 A     2/2009
(Continued)

*Primary Examiner* — Timothy J Weidner
(74) *Attorney, Agent, or Firm* — Womble Bond Dickinson (US) LLP

(57) ABSTRACT

Embodiments of the present invention disclose a data processing method, an apparatus, and a system. The method includes: receiving, by a terminal device, first configuration information sent by a network device, where the first configuration information includes preemption indication information, and the preemption indication information indicates a preemption capability of a first logical channel; before multiplexing of a MAC PDU is completed or a MAC PDU generated by multiplexing is transmitted to a physical layer, when a MAC layer has a first data unit, preempting, by the terminal device for the first data unit based on the preemption indication information, a resource allocated by the terminal device for a second data unit, where the first data unit corresponds to the first logical channel, and the second data unit corresponds to a second logical channel; and multiplexing, by the terminal device, the first data unit by using the preempted resource.

20 Claims, 7 Drawing Sheets

(51) Int. Cl.
| | |
|---|---|
| *H04L 12/851* | (2013.01) |
| *H04L 12/911* | (2013.01) |
| *H04W 4/06* | (2009.01) |
| *H04W 4/70* | (2018.01) |
| *H04W 24/02* | (2009.01) |
| *H04W 28/02* | (2009.01) |
| *H04W 28/14* | (2009.01) |
| *H04W 72/04* | (2009.01) |
| *H04W 72/10* | (2009.01) |
| *H04W 72/12* | (2009.01) |
| *H04W 88/06* | (2009.01) |
| *H04W 88/10* | (2009.01) |
| *H04W 92/10* | (2009.01) |

(52) U.S. Cl.
CPC ............ *H04L 47/14* (2013.01); *H04L 47/245* (2013.01); *H04L 47/70* (2013.01); *H04L 47/78* (2013.01); *H04W 4/06* (2013.01); *H04W 4/70* (2018.02); *H04W 24/02* (2013.01); *H04W 28/0252* (2013.01); *H04W 28/0273* (2013.01); *H04W 28/0278* (2013.01); *H04W 28/14* (2013.01); *H04W 72/042* (2013.01); *H04W 72/0406* (2013.01); *H04W 72/048* (2013.01); *H04W 72/10* (2013.01); *H04W 72/1242* (2013.01); *H04W 72/1278* (2013.01); *H04W 72/1289* (2013.01); *H04W 88/06* (2013.01); *H04W 88/10* (2013.01); *H04W 92/10* (2013.01)

(58) Field of Classification Search
CPC ...... H04L 47/70–829; H04W 4/06–10; H04W 4/50–90; H04W 24/02–10; H04W 28/02–26; H04W 72/005–14; H04W 74/002–08; H04W 74/0866–0891; H04W 76/10–50; H04W 88/02; H04W 88/04–12; H04W 92/04; H04W 92/08; H04W 92/10
See application file for complete search history.

(56) References Cited

U.S. PATENT DOCUMENTS

| | | |
|---|---|---|
| 2011/0038339 A1 | 2/2011 | Zhang |
| 2018/0139770 A1* | 5/2018 | Ozturk .............. H04W 72/1247 |
| 2018/0270699 A1* | 9/2018 | Babaei .............. H04W 72/1284 |
| 2018/0279326 A1* | 9/2018 | Park .................. H04W 72/1289 |

FOREIGN PATENT DOCUMENTS

| | | |
|---|---|---|
| CN | 101572913 A | 11/2009 |
| CN | 102685914 A | 9/2012 |
| EP | 2693800 A1 | 2/2014 |
| WO | 2004008698 A2 | 1/2004 |

* cited by examiner

DATA PROCESSING METHOD, APPARATUS, AND SYSTEM

CROSS-REFERENCE TO RELATED APPLICATION

This application is a continuation of International Application No. PCT/CN2017/115663, filed on Dec. 12, 2017, which claims priority to Chinese Patent Application No. 201710018782.5, filed on Jan. 10, 2017. The disclosure of the aforementioned application are hereby incorporated by reference in their entirety.

TECHNICAL FIELD

This application relates to the field of communications technologies, and specifically, to a data processing method, an apparatus, and a system.

BACKGROUND

In a long term evolution (LTE) system, a hierarchical structure is used for an air interface protocol stack. A protocol stack is mainly divided into a physical layer (layer 1), a data link layer (layer 2), and a network layer (layer 3). The layer 2 is mainly responsible for processing radio resource control (RRC) signaling or service data. The layer 2 includes three sublayers: packet data convergence protocol (PDCP), radio link control (RLC), and media access control (MAC).

When needing to send data to a network device, a terminal device needs to first set up a radio bearer (RB). Each RB corresponds to a group of configuration parameters of the layer 2 (including the PDCP, RLC, and MAC layers). A logical channel (LCH) is an interface of an RB between the RLC layer and the MAC layer. Data on an RB needs to be first processed by the layer 2 before being transmitted. Generally, uplink data generated by a terminal device is processed by the PDCP layer and the RLC layer and transmitted to the MAC layer through a logical channel, and becomes a MAC data unit. The terminal device multiplexes the MAC data unit based on a resource occupied by the MAC data unit, and forms a MAC protocol data unit (PDU) and transmits the MAC protocol data unit to a physical layer for sending.

In a possible case, before the MAC PDU is sent to the physical layer, a new data unit appears at the MAC layer. However, during multiplexing at the MAC layer, a resource is allocated in advance based on a data volume of each logical channel before the multiplexing. The new data unit cannot obtain a resource in time and consequently cannot be immediately processed, and needs to wait for processing after a current combined MAC PDU is sent. As a result, some important data cannot be sent in time.

Particularly, an ultra-reliable and low latency communication (URLLC) service exists in a 5G technology. This type of service has an extremely high latency requirement (a unidirectional transmission latency is 0.5 ms from an ingress point of the layer 2 at a transmit end to an egress point of the layer 2 at a receive end), and usually requires that service data be sent as soon as possible once generated. As described above, currently, data arriving in real time cannot be processed in a multiplexing process at the MAC layer, and can only wait for processing at a next transmission moment. Therefore, this cannot satisfy a low latency requirement of URLLC service data.

SUMMARY

Embodiments of the present invention provide a data processing method, an apparatus, and a system, to process a new MAC data unit in time before multiplexing of a MAC PDU is completed or a MAC PDU generated by multiplexing is sent to a physical layer, thereby satisfying a low latency requirement.

According to an aspect, an embodiment of the present invention provides a data processing method. The method includes: A terminal device receives first configuration information sent by a network device, where the first configuration information includes preemption indication information, and the preemption indication information indicates a preemption capability of a first logical channel. Before multiplexing of a media access control (MAC) protocol data unit (PDU) is completed or a MAC PDU generated by multiplexing is transmitted to a physical layer, when a MAC layer has a first data unit, the terminal device preempts, for the first data unit based on the preemption indication information, a resource allocated by the terminal device for a second data unit, where the first data unit corresponds to the first logical channel, and the second data unit corresponds to a second logical channel. The terminal device multiplexes the first data unit by using the preempted resource. In the method provided in this embodiment, the terminal device can process a new MAC data unit in time. Therefore, this ensures timely transmission of important data and satisfies a low latency requirement.

In one embodiment, the first configuration information further includes logical channel priority information, and a priority of the second logical channel is lower than that of the first logical channel.

In one embodiment, the preemption indication information includes preempting information of the first logical channel and/or preempted information of the second logical channel.

In one embodiment, the multiplexing, by the terminal device, the first data unit by using the preempted resource includes: re-multiplexing, by the terminal device, a MAC data unit by using the preempted resource and the first data unit, to generate a MAC PDU.

In one embodiment, the MAC data unit includes a MAC service data unit (SDU) or a MAC control element (CE).

In one embodiment, after the receiving, by a terminal device, first configuration information sent by a network device, the method further includes: allocating, by the terminal device by using the MAC layer, a resource for all logical channels corresponding to the MAC data unit that has not been multiplexed, where all the logical channels include the second logical channel; and generating, by the terminal device based on the resource, the MAC data unit that has not been multiplexed.

In one embodiment, after the receiving, by a terminal device, first configuration information sent by a network device, the method further includes: configuring, by the terminal device, a maximum resource value preempted for the first data unit; or preempting, by the terminal device based on the maximum resource value preempted for the first data unit, the resource allocated by the terminal device for the second data unit.

In one embodiment, after the receiving, by a terminal device, first configuration information sent by a network device, the method further includes: configuring, by the terminal device, a maximum resource value occupied by all data units of the first logical channel; and preempting, by the terminal device based on the maximum resource value occupied by all data units of the first logical channel, the resource allocated by the terminal device for the second data unit.

In one embodiment, when a sum of resources occupied by the MAC data unit that has not been multiplexed and the first data unit is greater than the resource, re-multiplexing, by the terminal device, the MAC data unit.

In one embodiment, the re-multiplexing, by the terminal device, a MAC data unit by using the preempted resource and the first data unit, to generate a MAC PDU further includes: indicating, at the MAC layer by the terminal device, that the resource allocated to the second data unit is preempted; multiplexing, by the terminal device, a part of the second data unit based on a remaining part of the resource allocated for the second data unit; and indicating, by the terminal device, that a remaining part of the second data unit is not transmitted. Therefore, the terminal device can fully use a resource to maximize data transmission, and avoid resource waste while processing a new data unit in time.

In one embodiment, the re-multiplexing, by the terminal device, a MAC data unit by using the preempted resource and the first data unit, to generate a MAC PDU further includes: indicating, at the MAC layer by the terminal device, that the resource allocated to the second data unit is preempted; determining, by the terminal device, that the entire second data unit cannot be sent based on a remaining part of the resource allocated for the second data unit; discarding, by the terminal device, the second data unit; and indicating, by the terminal device, that the second data unit is not transmitted. Therefore, complete transmission of the first data unit can be ensured, thereby ensuring timely sending of important data.

In one embodiment, the re-multiplexing, by the terminal device, a MAC data unit by using the preempted resource and the first data unit, to generate a MAC PDU further includes: indicating, at the MAC layer by the terminal device, that the resource allocated to the second data unit is preempted; discarding, by the terminal device, all MAC data units other than the first data unit; and indicating, by the terminal device, that the discarded MAC data units are not transmitted. Therefore, the first data unit exclusively occupies the MAC PDU, and timely and accurate transmission of important data is ensured.

According to another aspect, an embodiment of the present invention provides a data processing method. The method includes: sending, by a network device, first configuration information to a terminal device, where the first configuration information includes preemption indication information, and the preemption indication information indicates a preemption capability of a first logical channel. In the method provided in this embodiment, the network device may configure a preemption capability for a logical channel of the terminal device, to ensure that important burst data can be transmitted in time to satisfy a low latency requirement.

In one embodiment, the first configuration information further includes logical channel priority information.

In one embodiment, the preemption indication information includes preempting information of the first logical channel and/or preempted information of the second logical channel.

According to still another aspect, an embodiment of the present invention provides a terminal device, including: a transceiver unit, configured to receive first configuration information sent by a network device, where the first configuration information includes preemption indication information, and the preemption indication information indicates a preemption capability of a first logical channel; and a processing unit, configured to: before multiplexing of a MAC PDU is completed or a MAC PDU generated by multiplexing is transmitted to a physical layer, when a MAC layer has a first data unit, preempt, for the first data unit based on the preemption indication information, a resource allocated by the terminal device for a second data unit, where the first data unit corresponds to the first logical channel, and the second data unit corresponds to a second logical channel; and the processing unit is further configured to multiplex the first data unit by using the preempted resource.

In one embodiment, the first configuration information further includes logical channel priority information, and a priority of the second logical channel is lower than that of the first logical channel.

In one embodiment, the preemption indication information includes preempting information of the first logical channel and/or preempted information of the second logical channel.

In one embodiment, the processing unit being further configured to multiplex the first data unit by using the preempted resource includes: the processing unit being further configured to re-multiplex a MAC data unit by using the preempted resource and the first data unit, to generate a MAC PDU.

In one embodiment, the MAC data unit includes a MAC SDU or a MAC CE.

In one embodiment, the processing unit is further configured to allocate, by using the MAC layer, a resource for all logical channels corresponding to the MAC data unit that has not been multiplexed, where all the logical channels include the second logical channel; and the processing unit is further configured to generate, based on the resource, the MAC data unit that has not been multiplexed.

In one embodiment, the processing unit is further configured to: configure a maximum resource value preempted for the first data unit; and preempt, based on the maximum resource value preempted for the first data unit, the resource allocated by the processing unit for the second data unit.

In one embodiment, the processing unit is further configured to: configure a maximum resource value occupied by all data units of the first logical channel; and preempt, based on the maximum resource value occupied by all data units of the first logical channel, the resource allocated by the processing unit for the second data unit.

In one embodiment, when a sum of resources occupied by the MAC data unit that has not been multiplexed and the first data unit is greater than the resource, the processing unit is further configured to re-multiplex the MAC data unit.

In one embodiment, the processing unit is further configured to indicate, at the MAC layer, that the resource allocated to the second data unit is preempted; the processing unit is further configured to multiplex a part of the second data unit based on a remaining part of the resource allocated for the second data unit; and the processing unit is further configured to indicate that a remaining part of the second data unit is not transmitted.

In one embodiment, the processing unit is further configured to indicate, at the MAC layer, that the resource allocated to the second data unit is preempted; the processing unit is further configured to determine that the entire second data unit cannot be sent based on a remaining part of the resource allocated for the second data unit; the processing unit is further configured to discard the second data unit; and the processing unit is further configured to indicate that the second data unit is not transmitted.

In one embodiment, the processing unit is further configured to indicate, at the MAC layer, that the resource allocated to the second data unit is preempted; the processing unit is further configured to discard all MAC data units other than the first data unit; and the processing unit is further configured to indicate that the discarded MAC data units are not transmitted.

In one embodiment, the terminal device may implement, by using hardware, functions implemented by the terminal device in the foregoing method. A structure of the terminal device may include a transceiver and a processor. The transceiver can implement a function of the transceiver unit. The processor can implement a function of the processing unit.

In one embodiment, the terminal device may alternatively implement, by using hardware executing corresponding software, functions implemented by the terminal device in the foregoing method. The hardware or software includes one or more modules corresponding to the foregoing function. The modules may be software and/or hardware.

According to still another aspect, an embodiment of the present invention provides a network device, including: a processing unit, configured to generate first configuration information, where the first configuration information includes preemption indication information, and the preemption indication information indicates a preemption capability of a first logical channel of a terminal device; and a transceiver unit, configured to send the first configuration information to the terminal device.

In one embodiment, the network device may implement, by using hardware, the function performed by the network device in the foregoing method. A structure of the network device may include a processor and a transceiver. The processor can implement a function of the processing unit. The transceiver can implement a function of the transceiver unit.

In one embodiment, the network device may implement, by using hardware executing corresponding software, the function performed by the network device in the foregoing method. The hardware or software includes one or more modules corresponding to the foregoing function. The modules may be software and/or hardware.

According to still another aspect, an embodiment of the present invention provides a communications system. The system includes the terminal device and the network device according to the foregoing aspects.

According to yet another aspect, an embodiment of the present invention provides a computer storage medium, configured to store computer software instructions used by the foregoing terminal device. The computer storage medium includes a program designed for executing the foregoing aspects.

According to yet another aspect, an embodiment of the present invention provides a computer storage medium, configured to store computer software instructions used by the foregoing network device. The computer storage medium includes a program designed for executing the foregoing aspects.

Based on the technical solutions provided in the embodiments of the present invention, before multiplexing of a MAC PDU is completed or a MAC PDU generated by multiplexing is transmitted to a physical layer, when a MAC layer has a first data unit, the first data unit preempts the resource allocated by the terminal device for the second data unit. Therefore, this ensures timely transmission of important data and satisfies a low latency requirement.

BRIEF DESCRIPTION OF DRAWINGS

To describe the technical solutions in the embodiments of the present invention, the following briefly introduces the accompanying drawings required for describing the embodiments.

DESCRIPTION OF EMBODIMENTS

The following describes technical solutions in embodiments of the present invention with reference to accompanying drawings.

Figure 1:
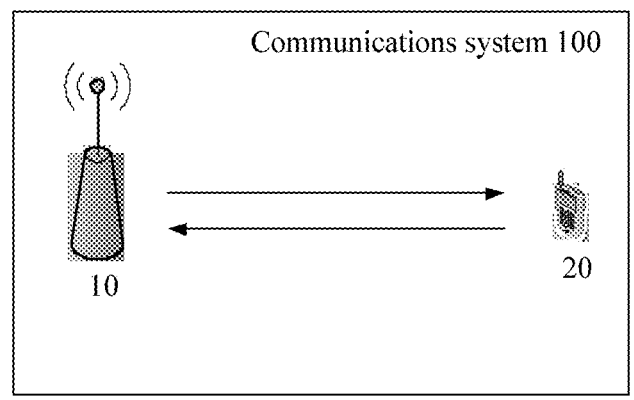
FIG. 1 is a schematic diagram of a communications system according to an embodiment of the present invention.

The technical solutions provided in the embodiments of the present invention are based on a communications system 100 shown in FIG. 1. The communications system 100 can support a URLLC service having a relatively high latency requirement. It may be understood that the communications system 100 also supports a data service having a conventional latency requirement such as an enhanced mobile broadband (eMBB) service. The communications system 100 includes at least one network device and at least one terminal device. As shown in FIG. 1, the communications system 100, for example, includes a network device 10 and a terminal device 20. The network device 10 may send control information and service data to the terminal device 20, and may receive control information and service data sent by the terminal device 20.

It should be understood that in this embodiment of the present invention, the communications system 100 may be a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), and other wireless communications systems using an orthogonal frequency division multiplexing (OFDM) technology. In addition, the communications system 100 may be further applied to a 5G communications technology. The system architecture and the service scenario described in the embodiments of the present invention are intended to describe the technical solutions in the embodiments of the present invention more clearly, and do not constitute a limitation on the technical solutions provided in the embodiments of the present invention. A person of ordinary skill in the art may know that: With the evolution of the network architecture and the emergence of new service scenarios, the technical solutions provided in the embodiments of the present invention are also applicable to similar technical problems.

In this embodiment of the present invention, the terminal device may also be referred to as user equipment (UE), a mobile station (MS), a mobile terminal, or the like. The terminal device may communicate with one or more core networks through a radio access network (RAN). For example, the terminal device may be a mobile phone (or referred to as a "cellular" phone), a computer having a mobile terminal, or the like. For example, the terminal device may further be a portable, pocket-sized, handheld, computer built-in, or in-vehicle mobile apparatus. These apparatuses exchange voice and/or data with the radio access network.

In this embodiment of the present invention, the network device may also be referred to as an access network device. For example, the network device may be a base transceiver station (BTS) in GSM or CDMA, may be a NodeB (NB) in WCDMA, may be an evolved Node B (eNB or e-NodeB) in LTE, or may be a network device in a 5G system. In this embodiment of the present invention, the network device and the terminal device are not specifically limited.

It should be noted that the quantity of the terminal devices included in the communications system 100 shown in FIG. 1 is merely an example, and the embodiments of the present invention are not limited thereto. For example, the communications system 100 may further include more terminal devices communicating with the network device. For brevity, the terminal devices are not described one by one in the accompanying drawings. In addition, although the communications system 100 shown in FIG. 1 includes the network device 10 and the terminal device 20, the communications system 100 may not be limited to include the network device and the terminal device, for example, may further include a core network device or a device used to carry a virtualized network function. These are apparently known by a person of ordinary skill in the art and are not described in detail herein one by one.

Figure 2:
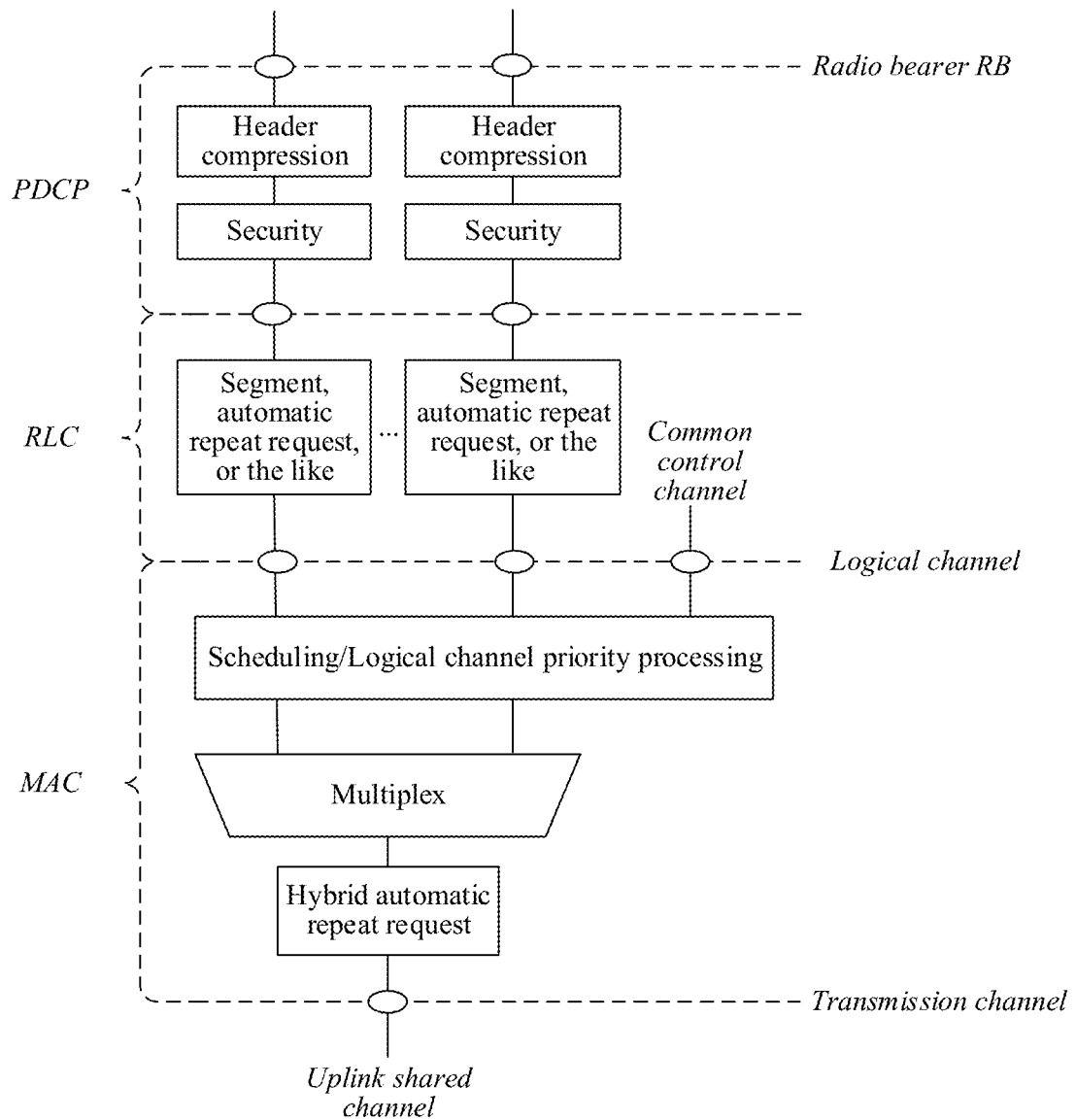
FIG. 2 is a schematic structural diagram of a layer 2 in an uplink direction according to an embodiment of the present invention.

As described above, a protocol stack of an air interface between a terminal device and a network device are divided into three layers. FIG. 2 shows a structure of a layer 2 in an uplink direction (that is, a direction of transmission from a terminal device to a network device). At the layer 2, uplink data is processed at the PDCP sublayer, the RLC sublayer, and the MAC sublayer in sequence. With reference to FIG. 2, at the three sublayers of the layer 2, data is mainly processed as follows:

PDCP layer: Data header compression and/or decompression; data encryption and/or decryption; signaling encryption and/or decryption, integrity protection and authentication; sequential delivery based on a PDCP sequence number (Sequence Number, SN) and repeated packet detection, or the like.

RLC layer: Segmenting data transmitted from the PDCP layer; reassembling data transmitted from the MAC layer (for an acknowledged mode (AM) and an unacknowledged mode (UM)); re-segmenting an RLC PDU in the AM; re-sorting based on an RLC SN and repeated packet detection (the AM and the UM), or the like.

MAC layer: Mapping between a logical channel and a transmission channel; multiplexing a MAC service data unit (SDU) and/or a MAC control element (CE) corresponding to each logical channel and delivering the multiplexed MAC service data unit or MAC control element to a physical layer, demultiplexing a MAC PDU received from the physical layer and delivering the demultiplexed MAC PDU to the RLC layer; scheduling an information report (Scheduling Report (SR), buffer status report (BSR)), logical channel priority processing; selecting a radio resource transmission manner (for example, a modulation and coding scheme (MCS)), or the like.

As shown in FIG. 2, an elliptic node indicates an RB. A terminal device sets up an RB when needing to transmit uplink data. RBs are classified into a signaling RB (SRB) carrying a signaling message and a data RB (DRB) carrying service data. For each RB, at least one corresponding logical channel exists between the RLC layer and the MAC layer. A priority is configured for each logical channel. Priorities of different logical channels may be the same or different. The terminal device preferentially allocates a resource to a high-priority logical channel, to ensure that data of the high-priority logical channel is preferentially sent. The terminal device configures an RB-related parameter by receiving RRC signaling from a network device, where the RB-related parameter includes configuration information of a logical channel corresponding to an RB.

When data on an RB is transmitted through the layer 2, a possible processing process is as follows: uplink data generated by the terminal device is processed by the PDCP layer and is transmitted to the RLC layer. The uplink data is allocated to each logical channel and forms an RLC PDU. The RLC PDU is transmitted to the MAC layer through the logical channel and becomes a MAC SDU. The MAC layer may also have a MAC CE. The MAC CE does not need to be transmitted to the MAC layer through a logical channel, and is directly generated by the MAC layer. However, each MAC CE also corresponds to a logical channel. The MAC SDU and the MAC CE are both MAC data units. A resource occupied by the MAC data unit is allocated by the terminal device based on a priority of each logical channel corresponding to the MAC data unit. The terminal device multiplexes the MAC data unit based on an allocated resource, generates a MAC PDU, and transmits the MAC PDU to the physical layer for sending.

It may be understood that, before multiplexing of the MAC PDU is completed or the MAC PDU is transmitted to the physical layer, a new MAC data unit, for example, a data unit carrying a URLLC service may appear at any time. The new MAC data unit may need to be immediately processed. However, a MAC data unit is multiplexed based on a resource that the terminal device allocates to each logical channel in advance. In the prior art, after the terminal device allocates a resource to each logical channel, a resource cannot be additionally allocated immediately to the logical channel corresponding to the new MAC data unit. Therefore, the new MAC data unit obtains no resource and cannot be processed in real time, and needs to wait for processing at a next transmission moment. As a result, data included in the new MAC data unit cannot be sent in time, and this cannot satisfy a low latency requirement.

In view of the foregoing technical problem, in the data processing method provided in this embodiment of the present invention, a terminal device receives first configuration information that is sent by a network device and that includes preemption indication information; before multiplexing of a MAC PDU is completed or the MAC PDU is transmitted to a physical layer, when a new data unit corresponding to high-priority logical channel appears on a MAC layer, the terminal device preempts, for the new data unit based on the preemption indication information, a resource allocated by the terminal device for a data unit corresponding to a low-priority logical channel; and the terminal device re-multiplexes a MAC data unit and multiplexes the new data unit into a newly generated MAC PDU. Therefore, this ensures timely transmission of data of a high-priority logical channel, and satisfies a low latency requirement of the system.

Figure 3:
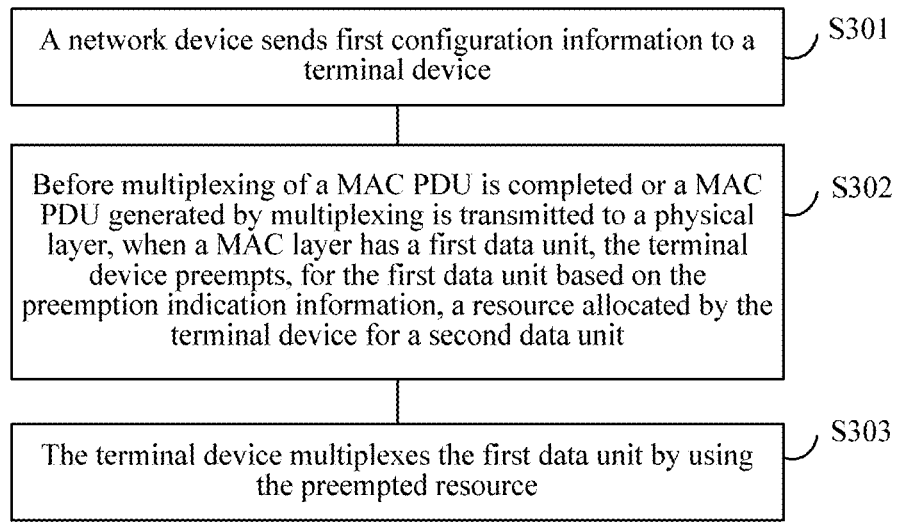
FIG. 3 is a schematic diagram of a data processing method according to an embodiment of the present invention.

FIG. 3 is a schematic diagram of a data processing method according to an embodiment of the present invention. The method provided in this embodiment is described below in detail with reference to FIG. 3.

S301: A network device sends first configuration information to a terminal device.

Correspondingly, the terminal device receives the first configuration information sent by the network device.

The network device may send the first configuration information by using RRC signaling. The network device may alternatively send the first configuration information by using a broadcast message. A specific manner of sending the first configuration information by the network device is not specifically limited in this embodiment of the present invention.

In one embodiment, the first configuration information includes preemption indication information, and the preemption indication information indicates a preemption capability of a first logical channel. The first logical channel is a logical channel that can preempt a resource. The preemption capability is a capability of preempting, by the first logical channel, a resource allocated by a MAC layer to another logical channel, so that the terminal device re-multiplexes a MAC data unit.

In one embodiment, the first configuration information further includes logical channel priority information. The preemption indication information indicates a preemption capability of the first logical channel based on a logical channel priority.

The priority information may be a priority value of each logical channel. Alternatively, as described above, each RB corresponds to at least one logical channel. The priority information may alternatively be RB configuration information. The RB configuration information includes a priority value of each logical channel corresponding to an RB. A priority of a corresponding logical channel may be determined by using the RB configuration information.

In one embodiment, the preemption indication information indicates that the first logical channel preempts a resource of a second logical channel. The second logical channel is a logical channel whose priority is lower than that of the first logical channel.

The preemption indication information may include preempting information of the first logical channel. For example, three logical channels exist between an RLC layer and the MAC layer and are LCH1, LCH2, and LCH3 whose priorities sequentially decrease. Preemption information of LCH1 may be configured in the preemption indication information, and LCH1 may preempt resources of LCH2 and LCH3. Alternatively, the preemption indication information may include preempted information of the second logical channel. Still using the foregoing example, preempted information of LCH3 may be configured in the preemption indication information, and LCH1 and LCH2 may both preempt a resource of LCH3.

The preemption indication information may further include both the preempting information of the first logical channel and the preempted information of the second logical channel. Still using the foregoing example, the preempting information of LCH1 and the preempted information of LCH3 may be configured in the preemption indication information, and LCH1 may preempt a resource of LCH3.

In one embodiment, the preemption indication information includes logical channel priority information. For example, the preemption indication information includes priority information 0, and it indicates that a logical channel having a priority of 0 has a capability of preempting a resource of another lower-priority logical channel.

It may be understood that a high-priority logical channel does not always preempt resources of all low-priority logical channels. For example, when both preempting and preempted logical channels are configured in a preemption relationship based on a logical channel priority, a logical channel for which neither preempting information nor preempted information is configured cannot preempt a resource of another logical channel, and a resource of the logical channel for which neither preempting information nor preempted information is configured cannot be preempted by another logical channel either. As shown in the foregoing example, LCH2 cannot preempt the resource of LCH3, and the resource of LCH2 cannot be preempted by LCH1.

In one embodiment, the first logical channel is a logical channel corresponding to a service having a relatively high latency requirement. For example, the first logical channel is a logical channel corresponding to a URLLC service. The second logical channel is a logical channel corresponding to a service having a conventional latency requirement. For example, the second logical channel is a logical channel corresponding to an eMBB service.

It may be understood that the first logical channel and the second logical channel may alternatively be logical channels corresponding to a same service having a latency requirement. For example, the first logical channel and the second logical channel are both logical channels corresponding to a URLLC service or an eMBB service. More important service data is allocated to the first logical channel. Less important service data is allocated to the second logical channel.

In the foregoing example, the preemption capability of the first logical channel is configured based on a logical channel priority. It may be understood that the network device may alternatively perform configuration based on another rule provided that the preemption capability of the first logical channel can be indicated. This is not specifically limited in the present invention.

In one embodiment, after the receiving, by a terminal device, first configuration information sent by a network device, the method further includes:

SS1: allocating, by the terminal device by using the MAC layer, a resource for all logical channels corresponding to the MAC data unit that has not been multiplexed, where all the logical channels include the second logical channel; and SS2: generating, by the terminal device based on the resource, the MAC data unit that has not been multiplexed, where the MAC data unit that has not been multiplexed includes a data unit corresponding to the second logical channel.

It may be understood that each MAC data unit corresponds to a logical channel, that is, each MAC data unit is associated with a logical channel. A plurality of MAC data units may correspond to a same logical channel. The MAC data unit may be a MAC SDU. As described above, uplink data generated by the terminal device is transmitted by the PDCP layer to the RLC layer. The uplink data is allocated to each logical channel at the RLC layer. The terminal device forms an RLC PDU based on a data volume to be transmitted on each logical channel. The RLC PDU is transmitted to the MAC layer through the logical channel. An RLC PDU arriving at the MAC layer becomes a MAC SDU. The MAC data unit may alternatively be a MAC CE. Similar to the MAC SDU, each MAC CE is also associated with a logical channel. However, the MAC CE is not a data unit transmitted to the MAC layer through a logical channel, but is a data unit generated by the MAC layer.

Resources allocated by the MAC layer to all the logical channels are indicated by an uplink grant. The uplink grant is scheduling information of uplink transmission of the terminal device. The uplink grant indicates a resource preconfigured by the network device.

In one embodiment, indicated by the network device, the terminal device obtains the uplink grant. The terminal device allocates generated uplink data to each logical channel. The terminal device sends a buffer status report (BSR) to the network device, and the BSR indicates a cached data volume of each logical channel. The network device indicates the uplink grant to the terminal device based on the BSR.

The terminal device may alternatively directly select an uplink grant in a grant free manner. For example, the terminal device determines the uplink grant based on an agreement with the network device.

In a possible implementation, the terminal device obtains a resource based on indication of the uplink grant before the RLC PDU is generated. In one embodiment, the terminal device allocates the uplink data to each logical channel at the RLC layer. The MAC layer allocates a resource to each logical channel based on a data volume of each logical channel and a logical channel priority. A resource is preferentially allocated to a high-priority logical channel. If the MAC layer has a MAC CE in this case, the MAC layer also allocates a resource to a logical channel corresponding to the MAC CE. In this way, a resource is allocated to a data unit corresponding to each logical channel. The MAC layer may indicate the allocation to the RLC layer after completing the allocation. The terminal device generates, at the RLC layer based on the resource allocated to each logical channel, an RLC PDU corresponding to each logical channel. The RLC PDU is transmitted to the MAC layer and becomes a MAC SDU. Both the MAC SDU and the MAC CE are used as the MAC data unit that has not been multiplexed, and wait for multiplexing at the MAC layer.

In one embodiment, regardless of whether the first logical channel has to-be-transmitted data, the terminal device further configures a maximum resource value that can be preempted by the first data unit. The maximum value is configured by the MAC layer. The MAC layer may configure the maximum resource value preempted by the first data unit. The MAC layer may also configure a maximum resource value occupied by all data units of the first logical channel.

In another possible implementation, the terminal device obtains a resource based on indication of the uplink grant after the RLC PDU is transmitted to the MAC layer. In one embodiment, the terminal device allocates the uplink data to each logical channel at the RLC layer. The terminal device generates the RLC PDU based on an actual data volume of each logical channel and transmits the RLC PDU to the MAC layer. The terminal device obtains a resource based on indication of the uplink grant. The MAC layer allocates the resource to each logical channel based on a data volume of each logical channel and a logical channel priority. A resource is preferentially allocated to a high-priority logical channel. The terminal device generates, at the MAC layer based on the resource allocated to each logical channel, a MAC SDU corresponding to each logical channel. If the MAC layer has a MAC CE in this case, the MAC layer also allocates a resource to a logical channel corresponding to the MAC CE. In this way, a resource is allocated to a data unit corresponding to each logical channel. Both the MAC SDU and the MAC CE are used as the MAC data unit that has not been multiplexed, and wait for multiplexing at the MAC layer.

In one embodiment, when a sum of resources occupied by the MAC data unit that has not been multiplexed and the first data unit is greater than the resource allocated by the MAC layer for all the logical channels, the terminal device preempts a resource for the first data unit.

It may be understood that if the sum of resources occupied by the MAC data unit that has not been multiplexed and the first data unit is less than the resource allocated by the MAC layer for all the logical channels, the first data unit may obtain sufficient resources and do not need to preempt a resource.

S302: Before multiplexing of a MAC PDU is completed or a MAC PDU generated by multiplexing is transmitted to a physical layer, when a MAC layer has a first data unit, the terminal device preempts, for the first data unit based on the preemption indication information, a resource allocated by the terminal device for a second data unit.

The first data unit corresponds to the first logical channel, and the second data unit corresponds to a second logical channel.

It may be understood that as described above, when the MAC layer allocates the resource to all the logical channels corresponding to the MAC data unit that has not been multiplexed, the second logical channel has to-be-transmitted data. Therefore, a resource is allocated to the second logical channel. The MAC data unit that has not been multiplexed includes the second data unit.

In one embodiment, when the MAC layer allocates the resource and the first logical channel has no to-be-transmitted data, no resource is allocated to the first logical channel. The MAC data unit that has not been multiplexed does not include a data unit corresponding to the first logical channel either. When the first logical channel has to-be-transmitted data, the MAC layer allocates a resource based on a current data volume of the first logical channel. The MAC data unit that has not been multiplexed includes the data unit corresponding to the first logical channel.

Generally, the MAC data unit that has not been multiplexed, that is, the MAC SDU or the MAC CE, waits for multiplexing at the MAC layer. The terminal device performs multiplexing based on a priority of a logical channel corresponding to the MAC SDU or the MAC CE. The MAC SDU or the MAC CE corresponding to a high-priority logical channel is preferentially multiplexed. The terminal device generates a MAC PDU after completing multiplexing all MAC data units. The MAC PDU is transmitted to the physical layer for sending.

However, before multiplexing of the MAC PDU is completed or the MAC PDU generated by multiplexing is transmitted to the physical layer, the MAC layer may have the first data unit. The first data unit may be a MAC SDU or a MAC CE. Because the first data unit appears after the MAC layer allocates a resource, the MAC layer cannot additionally allocate a resource for the first logical channel. Because the first data unit has no available resource, the first data unit preempts the resource allocated by the terminal device to the second data unit.

In one embodiment, the first data unit is a data unit carrying URLLC service data. The second data unit is a data unit carrying eMBB service data.

It may be understood that if the first data unit appears before multiplexing of the MAC PDU is completed, the terminal device stops the multiplex that is being performed. If the first data unit appears before the multiplexed MAC PDU is transmitted to the physical layer, the terminal device performs no transmission. The terminal device preempts, based on indication of the preemption indication information for the first data unit, the resource allocated by the terminal device to the second data unit. For the preemption indication information configured based on the logical channel priority, the second data unit is a data unit corresponding to a low-priority logical channel configured in the preemption indication information.

In a possible implementation, the first logical channel includes only one logical channel. The first data unit includes only a data unit corresponding to the logical channel. The terminal device performs preemption based on a data volume of the first data unit and a resource size allocated to the second data unit.

The foregoing example is still used for description. Three logical channels exist between an RLC layer and the MAC layer and are LCH1, LCH2, and LCH3 whose priorities sequentially decrease. It is configured in the preemption indication information that LCH1 preempts the resource of LCH3. The first data unit corresponds to LCH1. The second data unit corresponds to LCH3. For example, a resource of 8 bytes is allocated to LCH3. That is, the second data unit occupies the resource of 8 bytes. If the first data unit is 4 bytes, the first data unit preempts a resource of 4 bytes from the resource of the second data unit. If the first data unit is 10 bytes, because the second data unit is only 8 bytes, the first data unit preempts all the resource of 8 bytes of the second data unit.

In another possible implementation, the first logical channel includes a plurality of logical channels. In this case, the first data unit may include a plurality of data units corresponding to the plurality of logical channels.

In one embodiment, before multiplexing of the MAC PDU is completed or a MAC PDU generated by multiplexing is transmitted to the physical layer, the MAC layer has only the first data unit corresponding to one of the plurality of logical channels. The first data unit preempts a resource based on the foregoing implementation.

An example is used for description. Three logical channels exist between an RLC layer and the MAC layer and are LCH1, LCH2, and LCH3. It is configured in the preemption indication information that both LCH1 and LCH2 may preempt the resource of LCH3. A data unit 1 corresponds to LCH1 and a data unit 2 corresponds to LCH2. Both the data unit 1 and the data unit 2 are the first data unit. The second data unit corresponds to LCH3. Before multiplexing of the MAC PDU is completed or a MAC PDU generated by multiplexing is transmitted to the physical layer, if the MAC layer has only the data unit 1 (or the data unit 2), the data unit 1 (or the data unit 2) preempts the resource of the second data unit based on the foregoing implementation.

Before multiplexing of the MAC PDU is completed or a MAC PDU generated by multiplexing is transmitted to the physical layer, the MAC layer may have a plurality of the first data units corresponding to the plurality of logical channels.

In one embodiment, the plurality of logical channels have different priorities. The plurality of logical channels have different preemption capabilities. The first data units corresponding to different logical channels preempt the resource of the second data unit based on logical channel priorities. The first data unit of a high-priority logical channel preferentially preempts the resource of the second data unit.

For example, priorities of LCH1, LCH2, and LCH3 sequentially decrease. It is configured in the preemption indication information that both LCH1 and LCH2 may preempt the resource of LCH3. A data unit 1 corresponds to LCH1 and a data unit 2 corresponds to LCH2. Both the data unit 1 and the data unit 2 are the first data unit. The second data unit corresponds to LCH3. The resource occupied by the second data unit is 8 bytes. The data unit 1 is 6 bytes and the data unit 2 is 4 bytes. Because a priority of LCH1 is higher than that of LCH2, the data unit 1 preferentially preempts a resource of 6 bytes of the second data unit. The data unit 2 can preempt only the remaining resource of 2 bytes of the second data unit.

In one embodiment, the plurality of logical channels have a same priority. The plurality of logical channels have a same preemption capability. The first data units corresponding to different logical channels preempt the resource of the second data unit based on a preset rule.

For example, it is configured that LCH1 and LCH2 have a same priority that is higher than that of LCH3. It is configured in the preemption indication information that both LCH1 and LCH2 may preempt the resource of LCH3. The data unit 1 corresponds to LCH1 and the data unit 2 corresponds to LCH2. Both the data unit 1 and the data unit 2 are the first data unit. The second data unit corresponds to LCH3.

In one embodiment, the first data units corresponding to different logical channels equally divide the resource allocated by the terminal device to the second data unit. For example, the resource occupied by the second data unit is 8 bytes. The data unit 1 is 6 bytes and the data unit 2 is 4 bytes. Because LCH1 and LCH2 have a same preemption capability, resources actually required by the data unit 1 and the data unit 2 are not considered. The data unit 1 and the data unit 2 equally divide the resource of 8 bytes of the second data unit. That is, both the data unit 1 and the data unit 2 preempt a resource of 4 bytes. As a resource is preempted through equal division, all the first data units corresponding to different logical channels having the same preemption capability can obtain a preempted resource, to ensure that all important data of the different logical channels can be processed in time.

In one embodiment, the first data units corresponding to different logical channels preempt, based on a resource occupation ratio, the resource allocated by the terminal device to the second data unit. For example, the resource occupied by the second data unit is 8 bytes. The data unit 1 is 9 bytes and the data unit 2 is 3 bytes. A ratio of a resource required by the data unit 1 to that of the data unit 2 is (9 bytes:3 bytes)=(3:1). Therefore, the data unit 1 and the data unit 2 preempt the resource of 8 bytes of the second data unit based on the ratio of the resource required by the data unit 1 to that of the data unit 2. That is, the data unit 1 preempts a resource of 6 bytes and the data unit 2 preempts a resource of 2 bytes. As a resource is preempted based on the ratio, more data of a logical channel having a large data volume can be processed and sent, to ensure that all important data of the different logical channels can be processed in time.

In one embodiment, the first data units corresponding to different logical channels preempt, based on an integrity first rule, the resource allocated by the terminal device to the second data unit. For example, the resource occupied by the second data unit is 8 bytes. The data unit 1 is 9 bytes and the data unit 2 is 4 bytes. A resource required by the data unit 1 is greater than the resource of the second data unit. Although preempting the entire resource of the second data unit, the entire data unit 1 cannot be sent. A resource required by the data unit 2 is less than the resource of the second data unit. The entire data unit 2 can be sent provided that the required resource is obtained. Therefore, the data unit 2 preferentially preempts the resource of 4 bytes of the second data unit. The data unit 1 preempts a remaining resource of 4 bytes of the second data unit. As an integrity first preemption manner is used, it can be ensured that some data is entirely sent, to ensure sending quality of important data.

S303: The terminal device multiplexes the first data unit by using the preempted resource.

In one embodiment, the terminal device re-multiplexes a MAC data unit by using the preempted resource and the first data unit, to generate a MAC PDU.

As described above, after the first data unit appears at the MAC layer, the terminal device stops multiplexing that is currently being performed. Alternatively, the terminal device stops transmitting the generated MAC PDU to the physical layer. The terminal device re-multiplexes the MAC data unit including the first data unit.

In one embodiment, in a process of re-multiplexing the MAC data unit, the terminal device multiplexes the first data unit by using the preempted resource.

In a possible implementation, the re-multiplexing the MAC data unit includes:

indicating, at the MAC layer by the terminal device, that the resource allocated to the second data unit is preempted; multiplexing, by the terminal device, a part of the second data unit based on a remaining part of the resource allocated for the second data unit; and indicating that a remaining part of the second data unit is not transmitted.

Descriptions are provided below with reference to FIG. 4. Still using the foregoing example, three logical channels exist between an RLC layer and the MAC layer and are LCH1, LCH2, and LCH3. It is configured in the preemption indication information that LCH1 may preempt the resource of LCH3. The first data unit corresponds to LCH1 and the second data unit corresponds to LCH3. In this example, when the MAC layer allocates a resource, LCH1 has no to-be-transmitted data. Therefore, no resource is allocated to LCH1. For example, a resource of 10 bytes is allocated to LCH3, that is, the second data unit occupies a resource of 10 bytes. Both the second data unit and a data unit corresponding to another logical channel, for example, the data unit corresponding to LCH2, are multiplexed at the MAC layer.

In a multiplexing process or before the MAC PDU generated by multiplexing is transmitted to the physical layer, the first data unit is transmitted to the MAC layer. The first data unit requires a resource of 6 bytes. Therefore, the first data unit preempts the resource of the second data unit to obtain the resource of 6 bytes. 4 bytes of the resource allocated by the terminal device to the second data unit further remain.

It is indicated, at the MAC layer, that the resource allocated to the second data unit is preempted. As a result, the terminal device can multiplex 4 bits of the second data unit only by using the remaining resource. The terminal device re-multiplexes the MAC data unit at the MAC layer, and generates a MAC PDU by adding a MAC header. The MAC PDU generated by re-multiplexing includes the first data unit, the data unit corresponding to LCH2, and 4 bits of the second data unit. The MAC layer further indicates that 6 bytes of the second data unit is not transmitted. The second data unit not transmitted waits for processing at a next transmission moment.

In this implementation, the terminal device multiplexes a part of the second data unit by using the remaining part of the resource allocated to the second data unit, so that the resource is fully used and some relatively important data corresponding to the second logical channel can be transmitted in time.

In another possible implementation, the re-multiplexing the MAC data unit includes:

indicating, at the MAC layer by the terminal device, that the resource allocated to the second data unit is preempted; after determining that the entire second data unit cannot be sent based on the remaining part of the resource allocated for the second data unit, discarding, by the terminal device, the second data unit; and indicating, by the terminal device, that the second data unit is not transmitted.

Descriptions are provided below with reference to FIG. 5. Still using the foregoing example, after the first data unit preempts the resource of 6 bytes of the second data unit, it is indicated at the MAC layer that the resource allocated to the second data unit is preempted. 4 bytes of the resource allocated by the terminal device to the second data unit further remain. However, the remaining resource of 4 bytes cannot sufficiently send the entire 10 bytes of the second data unit. In this case, the terminal device discards all the 10 bytes of the second data unit. The MAC PDU generated by re-multiplexing includes the first data unit and the data unit corresponding to LCH2, but does not include the second data unit. It is further indicated at the MAC layer that the 10 bytes of the second data unit is not transmitted. The second data unit not transmitted waits for processing at a next transmission moment.

In this implementation, the terminal device discards the entire second data unit, to ensure transmission of the entire first data unit, thereby ensuring timely sending of important data.

In still another possible implementation, the re-multiplexing the MAC data unit includes:

indicating, at the MAC layer by the terminal device, that the resource allocated to the second data unit is preempted; discarding, by the terminal device, all MAC data units other than the first data unit; and indicating, by the terminal device, that the discarded MAC data units are not transmitted.

Descriptions are provided below with reference to FIG. 6. Still using the foregoing example, the first data unit preempts 6 bytes of the resource allocated by the terminal device to the second data unit. It is indicated, at the MAC layer, that the resource allocated to the second data unit is preempted. The terminal device discards both the second data unit and the data unit corresponding to LCH2. The MAC PDU generated by re-multiplexing includes only the first data unit, that is, the first data unit exclusively occupies the MAC PDU. It is further indicated, at the MAC layer, that the second data unit and the data unit corresponding to LCH2 are not transmitted. The data unit not transmitted waits for processing at a next transmission moment.

In this implementation, the first data unit exclusively occupies the MAC PDU, to ensure transmission of the entire first data unit, thereby ensuring timely sending and accuracy of important data.

In the embodiments of the present invention, before multiplexing of a MAC PDU is completed or a MAC PDU generated by multiplexing is transmitted to a physical layer, when a MAC layer has a first data unit, the first data unit preempts the resource allocated by the terminal device for the second data unit. Therefore, this ensures preferential transmission of important data and satisfies a low latency requirement.

The foregoing mainly describes the data processing method in the embodiments of the present invention from the perspective of interaction between network elements. It may be understood that, to implement the foregoing functions, the network elements, such as the network device and the terminal device, include a corresponding hardware structure and/or software module for performing each of the functions. A person of ordinary skill in the art should easily be aware that, in combination with the examples described in the embodiments disclosed in this specification, units, algorithms, and operations may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 7:
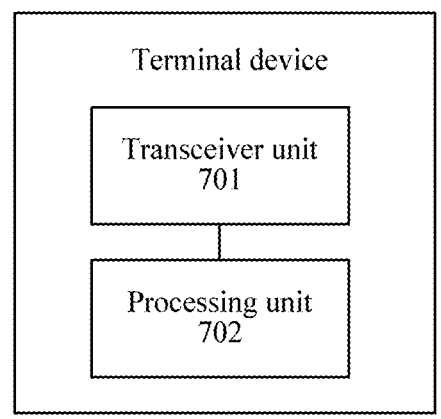
FIG. 7 is a possible schematic structural diagram of a terminal device according to an embodiment of the present invention.

FIG. 7 is a possible schematic structural diagram of the terminal device in the foregoing embodiments. It should be noted that the terminal device can perform the method in the foregoing embodiment. Therefore, for specifics thereof, refer to descriptions in the foregoing embodiment. For brevity, details of same content are no longer described again below. The terminal device may be the terminal device 20 shown in FIG. 1. The terminal device includes a transceiver unit 701 and a processing unit 702.

The transceiver unit 701 is configured to receive first configuration information sent by a network device, where the first configuration information includes preemption indication information, and the preemption indication information indicates a preemption capability of a first logical channel.

The processing unit 702 is configured to: before multiplexing of a MAC PDU is completed or a MAC PDU generated by multiplexing is transmitted to a physical layer, when a MAC layer has a first data unit, preempt, for the first data unit based on the preemption indication information, a resource allocated by the terminal device for a second data unit, where the first data unit corresponds to the first logical channel, and the second data unit corresponds to a second logical channel.

The processing unit 702 is further configured to multiplex the first data unit by using the preempted resource.

As described in S301 in the embodiment shown in FIG. 3, the first configuration information may further include logical channel priority information. As described in S301, the preemption indication information may include the preempting information of the first logical channel and/or the preempted information of the second logical channel, and details are no longer described herein one by one.

In one embodiment, the transceiver unit 701 is further configured to send a BSR to the network device, where the BSR indicates a cached data volume of each logical channel. Indicated by the network device, the transceiver unit 701 is further configured to obtain an uplink grant.

In one embodiment, the processing unit 702 is further configured to allocate, by using the MAC layer, a resource for all logical channels corresponding to the MAC data unit that has not been multiplexed, where all the logical channels include the second logical channel.

As described in S301 in the embodiment shown in FIG. 3, before an RLC PDU is generated, the processing unit 702 may allocate a resource to each logical channel at the RLC layer. After the RLC PDU is transmitted to the MAC layer, the processing unit 702 may allocate a resource to each logical channel at the MAC layer. The processing unit 702 is further configured to generate, based on the resource, the MAC data unit that has not been multiplexed.

In one embodiment, the processing unit 702 is further configured to configure a maximum resource value preempted for the first data unit; or configure a maximum resource value occupied by all data units of the first logical channel. The processing unit 702 is further configured to preempt, based on the maximum resource value preempted for the first data unit or the maximum resource value occupied by all data units of the first logical channel, the resource allocated by the processing unit 702 for the second data unit.

In one embodiment, when a sum of resources occupied by the MAC data unit that has not been multiplexed and the first data unit is greater than the resource allocated by the MAC layer for all the logical channels, the processing unit 702 preempts a resource for the first data unit based on indication of the preemption indication information.

It may be understood that, as described in S302 in the embodiment shown in FIG. 3, the processing unit 702 may preempt, for the first data unit based on indication of the preemption indication information, the resource allocated by the terminal device to the second data unit. The processing unit 702 may perform preemption based on the preemption indication information configured based on a logical channel priority.

In one embodiment, when the MAC layer has only the first data unit corresponding to one logical channel, the processing unit 702 performs preemption based on a data volume of the first data unit and a resource size allocated to the second data unit.

In one embodiment, when the MAC layer has the first data unit corresponding to a plurality of logical channels, if the plurality of logical channels have different priorities, the processing unit 702 performs preemption based on the priorities of the plurality of logical channels. If the plurality of logical channels have a same priority, the processing unit 702 performs preemption based on a preset rule described in S302.

After the MAC layer has the first data unit, the processing unit 702 is further configured to re-multiplex the MAC data unit by using the preempted resource and the first data unit, to generate the MAC PDU.

Figure 4:
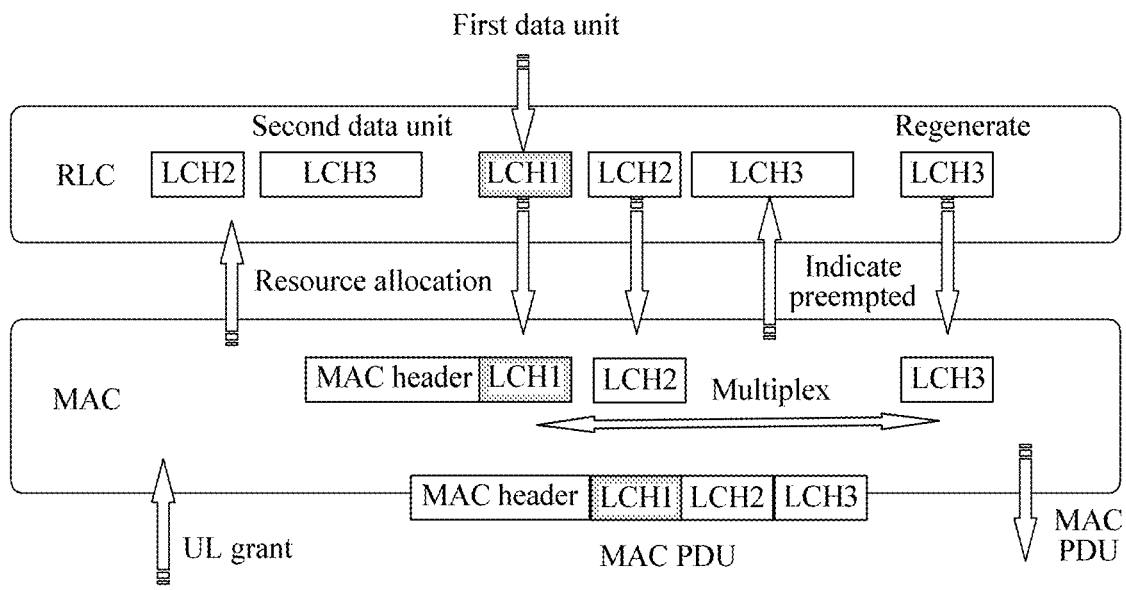
FIG. 4 shows a possible implementation of re-multiplexing a MAC data unit according to an embodiment of the present invention.

In one embodiment, as described in the implementation shown in FIG. 4, the processing unit 702 is further configured to indicate, at the MAC layer, that the resource allocated to the second data unit is preempted. The processing unit 702 is further configured to multiplex a part of the second data unit based on a remaining part of the resource allocated for the second data unit; and the processing unit 702 is further configured to indicate that a remaining part of the second data unit is not transmitted.

Figure 5:
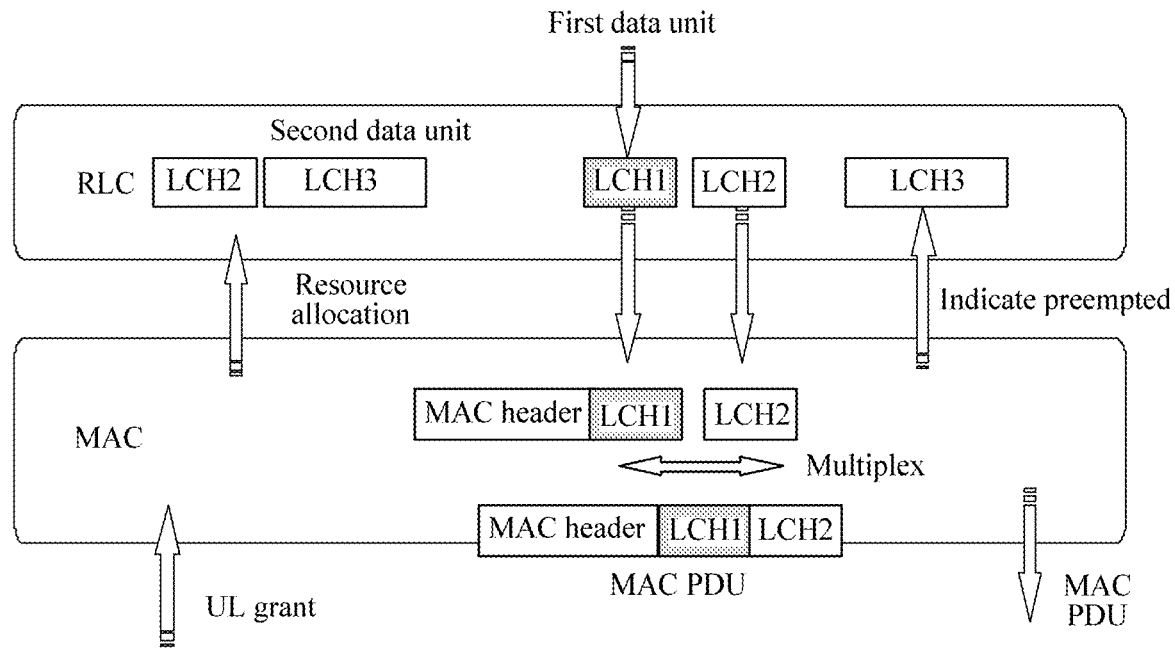
FIG. 5 shows another possible implementation of re-multiplexing a MAC data unit according to an embodiment of the present invention.

In one embodiment, as described in the implementation shown in FIG. 5, the processing unit 702 is further configured to indicate, at the MAC layer, that the resource allocated to the second data unit is preempted. The processing unit 702 is further configured to determine that the entire second data unit cannot be sent based on the remaining part of the resource allocated for the second data unit; the processing unit 702 is further configured to discard the second data unit; and the processing unit 702 is further configured to indicate that the second data unit is not transmitted.

Figure 6:
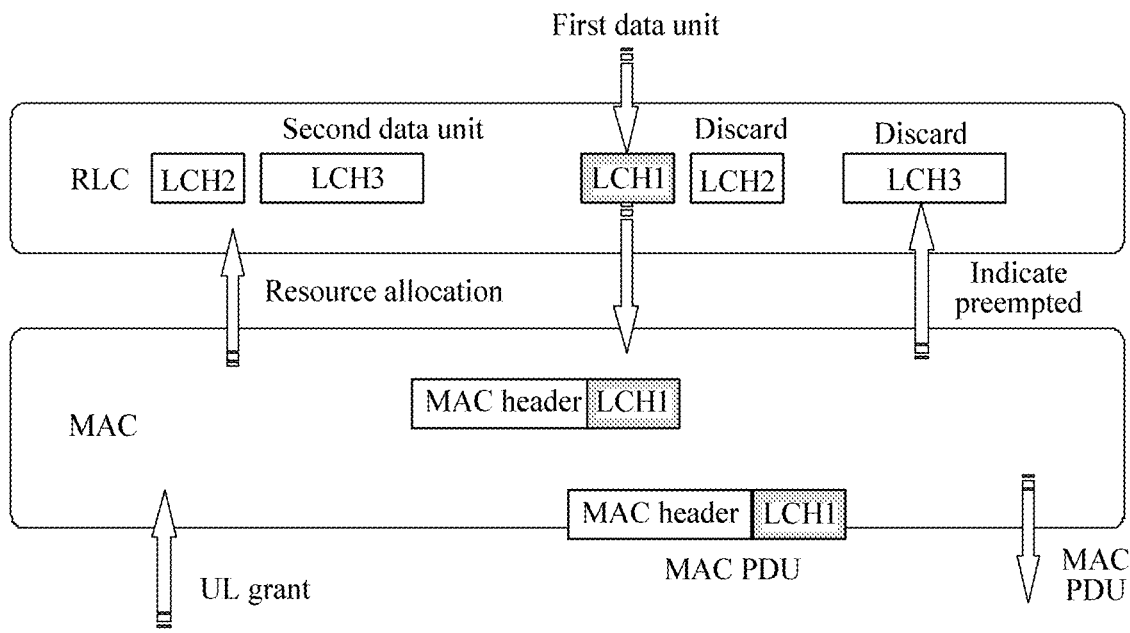
FIG. 6 shows still another possible implementation of re-multiplexing a MAC data unit according to an embodiment of the present invention.

In one embodiment, as described in the implementation shown in FIG. 6, the processing unit 702 is further configured to indicate, at the MAC layer, that the resource allocated to the second data unit is preempted. The processing unit 702 is further configured to discard all MAC data units other than the first data unit; and the processing unit 702 is further configured to indicate that the discarded MAC data units are not transmitted.

The transceiver unit 701 is further configured to send the generated MAC PDU to the network device through the physical layer.

Other implementable effects of the units that are not described are the same as related effects of the data processing method shown in FIG. 3 to FIG. 6, and details are not described herein again one by one. Through coordinated cooperation between the foregoing units, before multiplexing of a MAC PDU is completed or a MAC PDU generated by multiplexing is transmitted to a physical layer, when a MAC layer has a first data unit, the first data unit preempts the resource allocated by the terminal device for the second data unit. Therefore, this ensures preferential transmission of important data and satisfies a low latency requirement.

Figure 8:
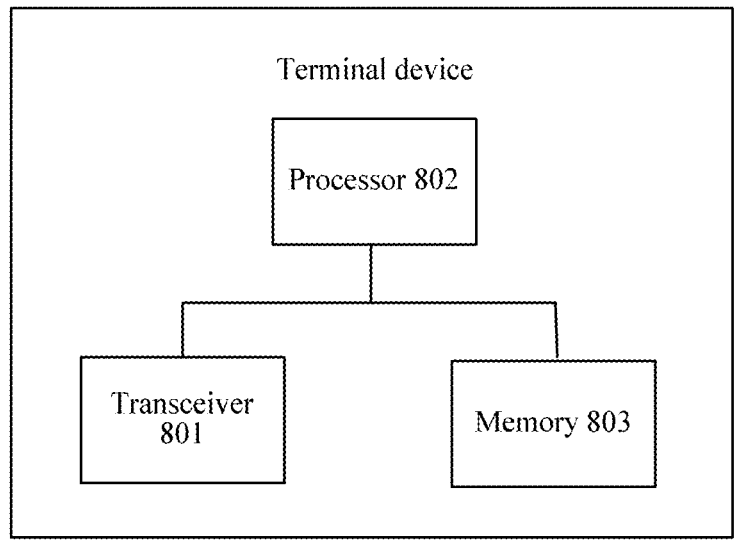
FIG. 8 is another possible schematic structural diagram of a terminal device according to an embodiment of the present invention.

FIG. 8 is a possible schematic structural diagram of the terminal device in the foregoing embodiments. The terminal device includes a transceiver 801 and a processor 802. The processing unit 702 described in FIG. 7 may be implemented by the processor 802, the transceiver unit 701 may be implemented by the transceiver 801, and the transceiver 801 may be configured to support data transmission between the terminal device and the network device in the foregoing embodiment. The terminal device may further include a memory 803 that may be configured to store program code and data of the terminal device. The components of the terminal device are coupled, and are configured to support the functions of the terminal device in the data processing method described in FIG. 3 to FIG. 6.

It may be understood that FIG. 8 shows only a simplified design of a terminal device. In an actual application, the terminal device may include any quantity of transceivers, processors, and memories, or the like, and all terminal devices that can implement the present invention fall within the protection scope of the present invention.

Figure 9:
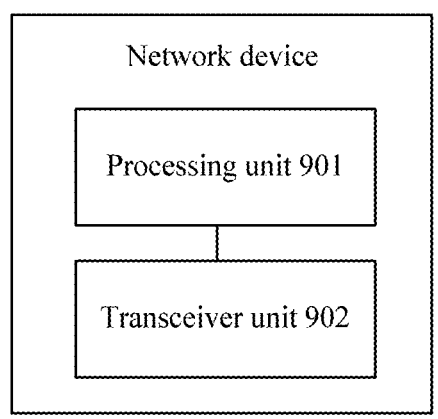
FIG. 9 is a possible schematic structural diagram of a network device according to another embodiment of the present invention.

FIG. 9 is a possible schematic structural diagram of the network device in the foregoing embodiment. It should be noted that the network device can perform the method in the foregoing embodiment. Therefore, for specifics thereof, refer to descriptions in the foregoing embodiment. For brevity, details of same content are no longer described again below. The network device may be the network device 10 shown in FIG. 1. The network device includes a processing unit 901 and a transceiver unit 902.

The processing unit 901 is configured to generate first configuration information, where the first configuration information includes preemption indication information, and the preemption indication information indicates a preemption capability of a first logical channel of a terminal device.

The transceiver unit 902 is configured to send the first configuration information to the terminal device.

In one embodiment, the transceiver unit 902 sends the first configuration information by using RRC signaling.

The transceiver unit 902 may alternatively send the first configuration information by using a broadcast message.

The transceiver unit 902 is further configured to receive a BSR sent by the terminal device and send an uplink grant indication to the terminal device.

Other implementable effects of the units that are not described are the same as related effects of the data processing method shown in FIG. 3 to FIG. 6, and details are not described herein again one by one. Through coordinated cooperation between the foregoing units, the network device may configure a logical channel preemption capability for the terminal device, to ensure preferential sending of important data and satisfy a low latency requirement.

Figure 10:
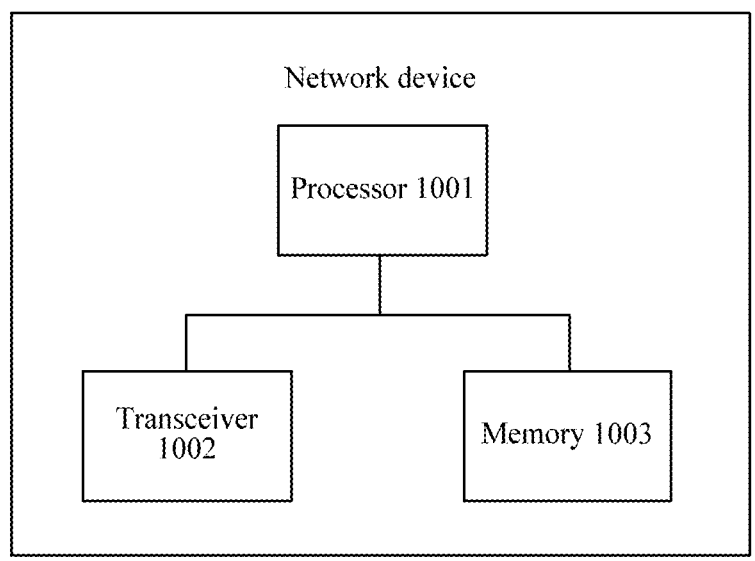
FIG. 10 is another possible schematic structural diagram of a network device according to an embodiment of the present invention.

FIG. 10 is a possible schematic structural diagram of the network device in the foregoing embodiment. The network device includes a processor 1001 and a transceiver 1002. The processing unit 901 described in FIG. 9 may be implemented by the processor 1001, the transceiver unit 902 may be implemented by the transceiver 1002, and the transceiver 1002 may be configured to support data transmission between the network device and the terminal device in the foregoing embodiment. The network device may further include a memory 1003 that may be configured to store program code and data of the network device. The components of the network device are coupled, and are configured to support the functions of the network device in the data processing method in the embodiments described in FIG. 3 to FIG. 6.

It may be understood that FIG. 10 shows only a simplified design of a network device. In an actual application, the network may include any quantity of transceivers, processors, and memories, or the like, and all network devices that can implement the present invention fall within the protection scope of the present invention.

It may be understood that the processor in the embodiments of the present invention may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor.

Operations of the methods or algorithms described in the embodiments of the present invention may be directly embedded into hardware, a software module executed by a processing unit, or a combination thereof. The software module may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processing unit so that the processing unit may read information from the storage medium and write information to the storage medium. Alternatively, the storage medium may further be integrated into a processing unit. The processing unit and the storage medium may be arranged in an ASIC, and the ASIC may be arranged in a user terminal device. In one embodiment, the processing unit and the storage medium may be arranged in different components of the user terminal device.

A person skilled in the art should be aware that in the foregoing one or more examples, functions described in the embodiments of the present invention may be implemented by hardware, software, firmware, or any combination thereof. If implemented in the software, the functions may be stored on a computer-readable medium, or may be transmitted on the computer-readable medium in a form of one or more instructions or code. The computer-readable medium includes a computer storage medium and a communication medium enabling the computer program to transfer from one place to another place. The storage medium may be an available medium that may be accessed by any general or special computer. For example, the computer-readable medium may include but is not limited to a RAM, a ROM, an EEPROM, a CD-ROM or another optical disc storage, a magnetic disk storage or another magnetic storage apparatus, or any other medium that may be configured to carry or store program code in a form of an instruction or a data structure and another form that can be read by a general-purpose/particular computer or a general-purpose/particular processing unit. In addition, any connection may be appropriately defined as a computer-readable medium. For example, if software is transmitted from a website, a server, or another remote resource by using a coaxial cable, an optical fiber, a twisted pair, a digital subscriber line (DSL) or in a wireless manner, such as infrared, radio, or microwave, the software is included in a defined computer-readable medium. The disc and the disk include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

The foregoing specific implementations further describe the objective, the technical solutions, and the beneficial effects of the embodiments of the present invention in detail. It should be understood that the foregoing is only specific implementations of the embodiments of the present invention, and is not intended to limit the protection scope of the embodiments of the present invention.

What is claimed is:

1. A data processing method, comprising:
receiving, by a terminal device, first configuration information sent by a network device, wherein the first configuration information comprises preemption indication information, and the preemption indication information indicates a preemption capability of a first logical channel;
before multiplexing of a Media Access Control (MAC) protocol data unit (PDU) is completed or a MAC PDU generated by multiplexing is transmitted to a physical layer, when a MAC layer has a first data unit, preempting, by the terminal device for the first data unit based on the preemption indication information, a resource allocated by the terminal device for a second data unit, wherein
the first data unit corresponds to the first logical channel, and the second data unit corresponds to a second logical channel; and
multiplexing, by the terminal device, the first data unit by using the preempted resource.

2. The method according to claim 1, wherein the first configuration information further comprises logical channel priority information, and a priority of the second logical channel is lower than that of the first logical channel.

3. The method according to claim 1, wherein the preemption indication information comprises preempting information of the first logical channel and/or preempted information of the second logical channel.

4. The method according to claim 1, wherein the multiplexing, by the terminal device, the first data unit by using the preempted resource comprises:
re-multiplexing, by the terminal device, a MAC data unit by using the preempted resource and the first data unit, to generate a MAC PDU.

5. The method according to claim 4, wherein after the receiving, by a terminal device, first configuration information sent by a network device, the method further comprises:
allocating, by the terminal device by using the MAC layer, a resource for all logical channels corresponding to the MAC data unit that has not been multiplexed, wherein all the logical channels comprise the second logical channel; and
generating, by the terminal device based on the resource, the MAC data unit that has not been multiplexed.

6. The method according to claim 5, wherein after the receiving, by a terminal device, first configuration information sent by a network device, the method further comprises:
configuring, by the terminal device, a maximum resource value preempted for the first data unit; or
configuring, by the terminal device, a maximum resource value occupied by all data units of the first logical channel.

7. The method according to claim 6, wherein the preempting, for the first data unit, a resource allocated by the terminal device for a second data unit comprises:
preempting, by the terminal device, based on the maximum resource value preempted for the first data unit, the resource allocated by the terminal device for the second data unit; or
preempting, by the terminal device, based on the maximum resource value occupied by all data units of the first logical channel, the resource allocated by the terminal device for the second data unit.

8. The method according to claim 5, wherein the re-multiplexing, by the terminal device, a MAC data unit by using the preempted resource and the first data unit, to generate a MAC PDU further comprises:
indicating, at the MAC layer by the terminal device, that the resource allocated to the second data unit is preempted;
multiplexing, by the terminal device, a part of the second data unit based on a remaining part of the resource allocated for the second data unit; and
indicating, by the terminal device, that a remaining part of the second data unit is not transmitted.

9. A terminal device comprising:
a processor; and
a non-transitory computer-readable storage medium storing a program to be executed by the processor, the program including instructions to:
receive first configuration information sent by a network device, wherein the first configuration information comprises preemption indication information, and the preemption indication information indicates a preemption capability of a first logical channel; and
before multiplexing of a MAC PDU is completed or a MAC PDU generated by multiplexing is transmitted to a physical layer, when a MAC layer has a first data unit, preempt, for the first data unit based on the preemption indication information, a resource allocated by the terminal device for a second data unit, wherein the first data unit corresponds to the first logical channel, and the second data unit corresponds to a second logical channel; and multiplex the first data unit by using the preempted resource.

10. The terminal device according to claim 9, wherein the first configuration information further comprises logical channel priority information, and a priority of the second logical channel is lower than that of the first logical channel.

11. The terminal device according to claim 9, wherein the preemption indication information comprises preempting information of the first logical channel and/or preempted information of the second logical channel.

12. The terminal device according to claim 9, wherein the program further including instructions to re-multiplex a MAC data unit by using the preempted resource and the first data unit, to generate a MAC PDU.

13. The terminal device according to claim 12, the program further including instructions to allocate, by using the MAC layer, a resource for all logical channels corresponding to the MAC data unit that has not been multiplexed, wherein all the logical channels comprise the second logical channel; and generate, based on the resource, the MAC data unit that has not been multiplexed.

14. The terminal device according to claim 13, the program further including instructions to configure a maximum resource value preempted for the first data unit; or configure a maximum resource value occupied by all data units of the first logical channel.

15. The terminal device according to claim 14, wherein the program further including instructions to preempt, based on the maximum resource value preempted for the first data unit, the resource allocated by the processor for the second data unit; or preempt, based on the maximum resource value occupied by all data units of the first logical channel, the resource allocated by the processor for the second data unit.

16. The terminal device according to claim 13, wherein when a sum of resources occupied by the MAC data unit that has not been multiplexed and the first data unit is greater than the resource allocated by the terminal device for all the logical channels corresponding to the MAC data unit that has not been multiplexed, the program further including instructions to re-multiplex the MAC data unit.

17. The terminal device according to claim 13, wherein the program further including instructions to indicate, at the MAC layer, that the resource allocated to the second data unit is preempted;

multiplex a part of the second data unit based on a remaining part of the resource allocated for the second data unit; and indicate that a remaining part of the second data unit is not transmitted.

18. A network device comprising:

a processor; and a non-transitory computer-readable storage medium storing a program to be executed by the processor, the program including instructions to:

generate first configuration information, wherein the first configuration information comprises preemption indication information, and the preemption indication information indicates a preemption capability of a first logical channel of a terminal device; and send the first configuration information to the terminal device, wherein the preemption capability includes a preemption, by the terminal device, of a resource allocated by the terminal device for a second data unit before multiplexing of a Media Access Control (MAC) protocol data unit (PDU) is completed or a MAC PDU generated by multiplexing is transmitted to a physical layer, when a MAC layer has a first data unit, and wherein the first data unit corresponds to the first logical channel, and the second data unit corresponds to a second logical channel; and multiplexing, by the terminal device, the first data unit by using the preempted resource.

19. The network device according to claim 18, wherein the first configuration information further comprises logical channel priority information.

20. The network device according to claim 18, wherein the preemption indication information comprises preempting information of the first logical channel and/or preempted information of a second logical channel.

* * * * *